United States Patent [19]

Staerzl

[11] Patent Number: 4,915,085
[45] Date of Patent: Apr. 10, 1990

[54] STARTING ENHANCER AND STABILIZER

[75] Inventor: Richard E. Staerzl, Fond du Lac, Wis.

[73] Assignee: Brunswick Corporation, Skokie, Ill.

[21] Appl. No.: 372,000

[22] Filed: Jun. 27, 1989

[51] Int. Cl.⁴ .......................................... F02M 23/08
[52] U.S. Cl. .................. 123/587; 123/179 A
[58] Field of Search ............... 123/179 A, 585, 587, 123/73 SC

[56] References Cited

U.S. PATENT DOCUMENTS

| | | | |
|---|---|---|---|
| 4,240,145 | 12/1980 | Yano et al. | 123/587 |
| 4,305,351 | 12/1981 | Staerzl | 123/73 A |
| 4,474,153 | 10/1984 | Hanamoto et al. | 123/587 |
| 4,699,110 | 10/1987 | Iwano et al. | 123/587 |
| 4,763,626 | 8/1988 | Staerzl | 123/438 |
| 4,794,889 | 1/1989 | Hensel | 123/73 SC |

*Primary Examiner*—Willis R. Wolfe
*Assistant Examiner*—M. Macy
*Attorney, Agent, or Firm*—Lockwood, Alex, Fitzgibbon & Cummings

[57] ABSTRACT

An assembly is provided for supplying a supplemental source of ambient air into the air intake manifold of a two-cycle internal combustion engine during start-up and abnormally low idle modes during which typically only minimal air would otherwise be available. Upon increase of engine speed, the supplemental ambient air flow is stopped. In one embodiment, a flow path is provided between the crankcase of the engine in order that puddled fuel will be bled from this location and to the location of the supplemental air inlet in order to thereby recycle and burn the puddled fuel during high speed operation of the engine.

18 Claims, 3 Drawing Sheets

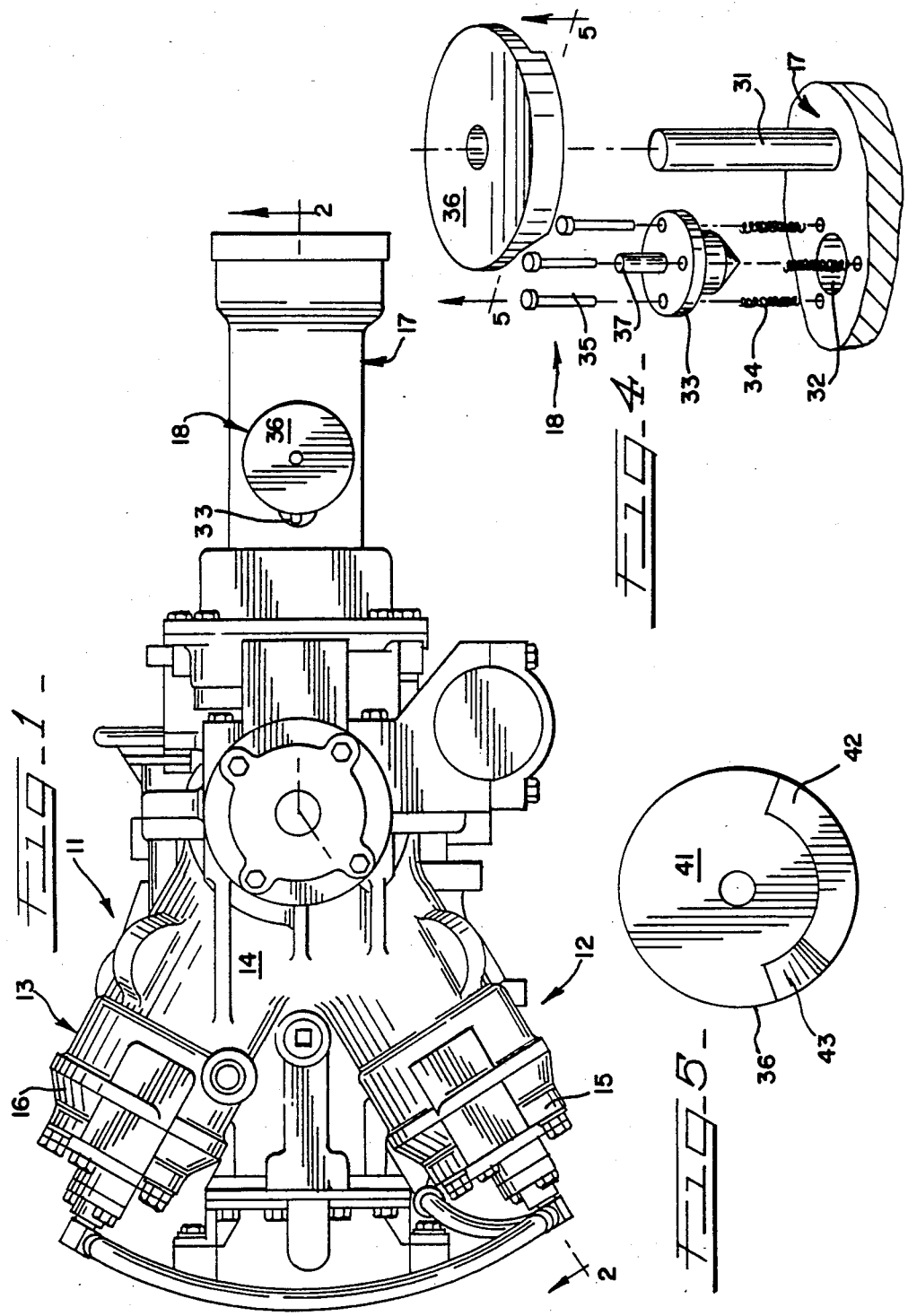

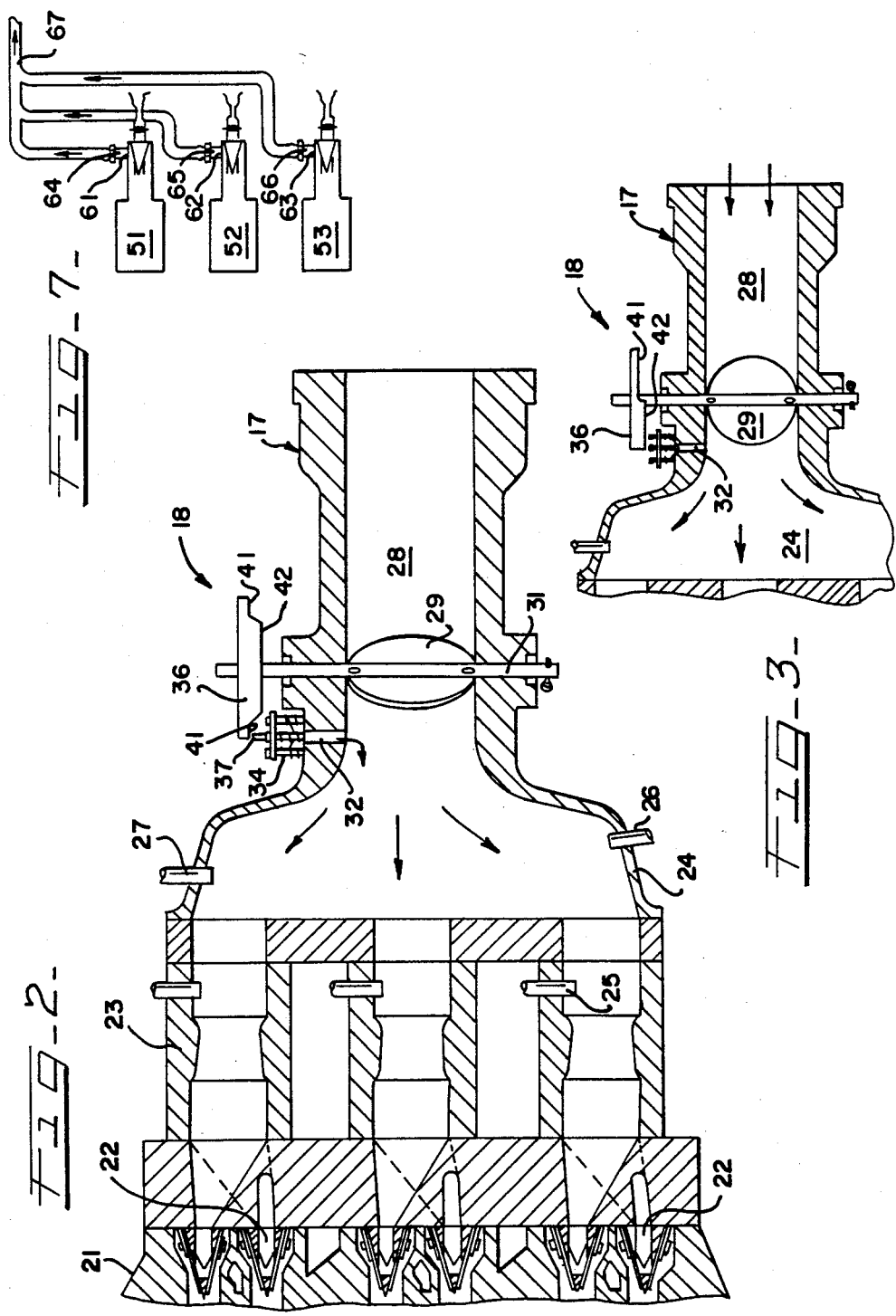

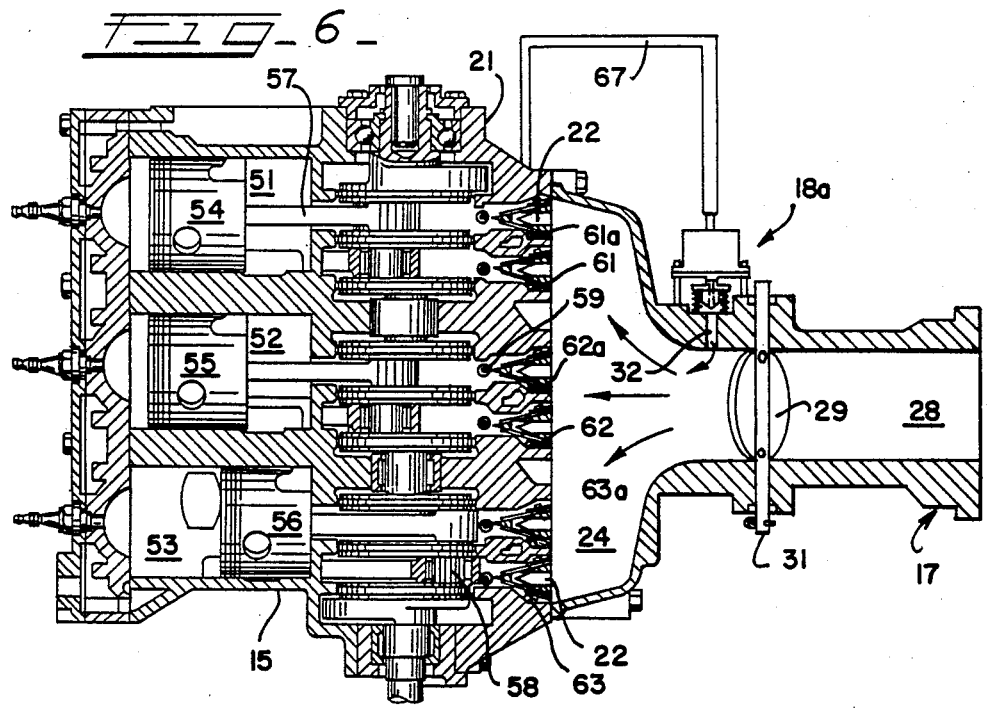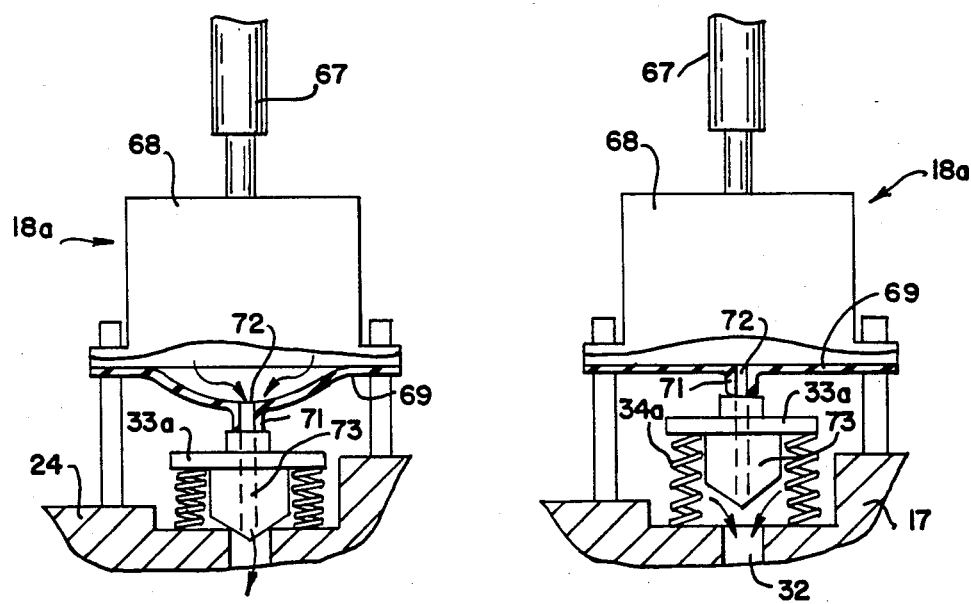

STARTING ENHANCER AND STABILIZER

DESCRIPTION

BACKGROUND AND SUMMARY OF THE INVENTION

The present invention generally relates to the enhancement of air flow into the air intake throat of an internal combustion engine at selected times during operation of the engine, particularly during engine start-up and under abnormal idle conditions as needed until adequate air flow into the engine has been established. An air intake valve assembly is positioned at a location downstream of the throttle valve of the engine in order to provide a flow of ambient air into the air intake throat at this location during the start-up mode of the engine, which flow of ambient air is blocked by operation of the intake valve assembly by the time the engine is in its open throttle mode.

Internal combustion engines have been developed which do not include what is generally known as a carburetor assembly. Instead, fuel injection systems are provided which may be either of the high pressure type or of the low pressure type. Low pressure fuel injection systems can be particularly well suited for two-cycle engines, and especially for internal combustion engines that are incorporated into marine outboard motors. These low pressure fuel injection systems are designed to eliminate the need for high pressure components, including high pressure fuel injectors, a high pressure fuel pump, and a constant fuel pressure regulator. Examples of these types of low pressure fuel injection systems are found in Staerzl U.S. Pat. No. 4,305,351 and No. 4,763,626, the subject matter thereof being incorporated by reference hereinto.

Whether high pressure or low pressure fuel injection systems are utilized, it is important to have the proper mixture of air and fuel for each particular mode of engine operation. Providing proper air flow during the various operational modes can present an especially difficult problem for two-cycle engines which tend to idle poorly, due in part to limited air supply paths in many two-cycle engines. Generally speaking, the primary source of air for the fuel and air mixture in these types of engines is through the throttle valve, which is typically closed or substantially closed during normal engine start-up and/or engine idling modes.

Various fuel and air routing paths have been proposed or attempted in order to provide the proper fuel and air mixture at each engine operation mode. At times the proposed systems are substantially complex and may require monitoring of engine parameters and inputs to the engine in an attempt to provide the proper mixtures. Often, these types of arrangements introduce complexities which may decrease long-term reliability. Complexity can be particularly troublesome in engines that are used under rugged conditions.

Another problem faces the manufacturers of engines and is especially prevalent for an engine which has its cylinders in a generally vertically stacked array, such as is the case in various marine outboard motor engines. With vertically stacked cylinders, there is a tendency, due the influence of gravity, for residue fuel to "puddle" along the portion of the crankcase walls which is lower than the rest of the particular crankcase. This condition can be aggravated because of the general tendency for the lower cylinders to receive a greater flow of fuel than the upper cylinders. This can lead to an unduly enriched fuel-air mixture in the lower cylinder or cylinders to the extent that even greater puddling can develop in the lower crankcase or crankcase chambers.

Because of these types of puddling problems, bleed systems have been developed for various engines. In earlier day marine outboard engines, this puddled fuel would be permitted to bleed from the crankcase and into the lake or other body of water on which the marine engine was operated Ecological considerations have resulted in the phase-out of this practice, and puddled fuel is typically recycled from low point locations in the crankcase generally adjacent to the reed block for one cylinder and to an inlet located in the sidewall of another cylinder at which the excess fuel can be burned. Usually, this type of recycling results in movement of puddled fuel during the start-up mode, resulting in an excessively rich fuel mixture that is burned during initial engine operation, which is usually manifested in the development of blue exhaust smoke which persists until the excess recycled fuel is burned off. This is not especially desirable, and means have been sought for removing the puddled fuel without either damaging the environment or creating an unpleasant trail of smoke.

By proceeding in accordance with the present invention, an arrangement is provided wherein a supplemental flow of air is introduced into the air intake throat of the engine at a location downstream of the throttle valve of the engine. The supplemental air flow is automatically provided while the engine is in its start-up mode and under abnormally slow idle conditions. This flow of supplemental air is cut off during normal operation or acceleration. By this arrangement, the supplemental source of air is provided when the throttle valve is closed or substantially closed, and the supplemental air flow ceases at least at those times during which the throttle valve is fully opened. When desired, the invention can be supplemented with a recycling assembly by which puddled fuel is directed for entry into the engine throat at this location downstream of the throttle valve and such that the recycled fuel enters after start-up in order to thereby burn the recycled fuel under engine operation conditions that are less likely to result in the development of concentrated exhaust smoke.

It is a general object of this invention to provide a mechanism for providing improved start-up conditions for an internal combustion engine.

Another object of the present invention is to provide an improved mechanism for stabilizing an internal combustion engine when abnormally low or slow idle conditions develop.

Another object of the present invention is to provide an improved starting enhancer and stabilizer for two-cycle engines by leaning out the fuel-to-air mixture during times of starting and abnormal idling.

Another object of this invention is to provide an assembly for supplementing the flow of ambient air into a low-pressure fuel injection system.

Another object of the present invention is to provide an improved apparatus and method for enhancing starting and stabilizing two-cycle internal combustion engines by automatically supplementing air flow thereinto at time when such supplemental air flow is desirable.

Another object of the present invention is to provide an improved apparatus and method for recycling puddled fuel from an engine crankcase to a suitable location in a fuel injection system.

Another object of the invention is to provide means for relieving an abnormally slow engine idle condition which can occur when the throttle is rapidly closed while the engine is running at a high rpm.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is an end elevational view of a multiple cylinder internal combustion engine of the type incorporated into marine outboard motors;

FIG. 2 is a cross-sectional view generally along the line 2—2 of FIG. 1 and illustrating an embodiment of a starting enhancer and stabilizer according to the present invention;

FIG. 3 is a view similar to FIG. 2 which illustrates an operational mode different from that shown in FIG. 2;

FIG. 4 is an exploded perspective view illustrating details of the air intake valve assembly illustrated in FIGS. 1, 2 and 3;

FIG. 5 is a bottom plan view of a cam component of the air intake valve assembly illustrated in FIG. 4;

FIG. 6 is a cross-sectional view which generally corresponds that of FIG. 2, but in which another embodiment of the starting enhancer and stabilizer is shown;

FIG. 7 is a somewhat schematic illustration of bleed assembly components associated with the FIG. 6 embodiment;

FIG. 8 is an enlarged detail view of the air intake valve assembly of FIG. 6, which assembly is illustrated in its mode when the engine is operating at a generally high speed; and FIG. 9 is a view similar to FIG. 8, but in which the engine is in its start-up mode.

DESCRIPTION OF PARTICULAR EMBODIMENTS

With reference to FIG. 1, a two-cycle V-6 engine having two banks of three cylinders at 60° angular separation is generally designated as 11. Two banks of cylinders, generally designated as 12 and 13, are illustrated. An engine block 14 includes cylinder heads 15 and 16. The overall construction of the engine 15 will be appreciated by those skilled in the art. Engine 11 includes an air inlet assembly 17 having an air flow enhancer assembly 18.

Further details of the air enhancer assembly 18 are found in FIGS. 2, 3, 4 and 5. FIG. 2 also illustrates other details of the engine 11. A block 21 supports fuel/air supply assemblies and supports a bank of one-way reed valve assemblies 22 of a generally known construction and function. The type of low pressure fuel injection system illustrated in FIG. 2 includes a venturi assembly 23 positioned between the reed valve assemblies 22 and an air intake manifold or chamber 24. Another type of low pressure fuel injection system is illustrated in FIG. 6, as described in more detail hereinafter. Typically, the system of FIG. 6 is preferred over that of FIG. 2, although the starting enhancer and stabilizers of the present invention may be used in conjunction with either of these low pressure fuel injection systems, or with other fuel injection systems as appropriate.

In the system shown in FIG. 2, low-pressure fuel injector tips 25 open into the venturi assembly 23, which atomizes fuel from the fuel outlets or injector tips 25 and delivers a fuel/air mixture to the cylinders downstream of the one-way reed valve assemblies 22. A tube 26 can be provided for sensing pressure generally at the fuel outlets or injector tips 25 by sensing the pressure in the air intake manifold 24, which is at substantially the same pressure. An air line 27 can be provided to cooperate with other components (not shown) to prevent siphoning of fuel which may otherwise occur because the cylinders are at different heights.

Air inlet assembly 17 includes a throat 28. A throttle plate or butterfly valve 29 is rotatably mounted therewithin onto a throttle shaft 31 in a generally known manner. The substantially closed orientation is illustrated in Fig. 2. Suitable linkage arrangements (not shown) are provided so that this generally closed orientation is imparted when the engine throttle (not shown) is substantially closed. The throttle plate 29 is shown in a substantially fully open orientation in FIG. 3, and this corresponds to a substantially fully open engine throttle condition. When the throttle plate 29 is open, air passes through the throat 28 and into the air intake manifold or chamber 24. The air then flows through the venturi assembly 23 and, with fuel from the tips 25, passes through each reed valve assembly 22 in order to thereby provide a fuel and air mixture to the cylinders.

With more particular reference to the air flow enhancement assembly 18, an opening 32 is provided through the wall of the air inlet assembly 17 at a location that is generally closely spaced downstream of the throttle plate 29. A generally cone-shaped plunger or valve element 33 is structured to seat within the opening 32 in order to thereby close same when desired. Biasing springs 34 movably mount the valve plunger 33 in a suitable manner, such as by way of pins 35, whereby the valve plunger 33 is biased to an open orientation, that is an orientation at which the valve plunger 33 is spaced away from the opening 32 in order to permit the flow of air into the air intake chamber 24 from outside of the engine 11. During operation of the illustrated air flow enhancer assembly 18, ambient air will be allowed to flow through the opening 32 when the valve plunger 33 is biased away from the opening 32. This condition continues for so long as the bias of the springs 34 is not overcome, and this condition persists during start-up. This condition also occurs under generally slower or lower than normal engine idle conditions which can develop when the throttle is rapidly closed while the engine is running at a fast rpm mode. Such condition causes a high vacuum and overly rich condition in the crankcase, which is relieved according to the present invention.

When the engine throttle and throttle plate 29 are opened so that a substantial flow of air passes through the air inlet assembly 17 and into the air intake chamber 24, a low pressure condition develops at the opening 32, which imparts a vacuum condition that is, in most cases, adequate to overcome the bias of the springs 34, with the result that the valve plunger 33 is drawn down onto the opening 32 in order to thereby close the opening and discontinue the passage of ambient air into the air intake chamber 24. This opened throttle or closed air flow condition enhancement is generally illustrated in FIG. 3.

Preferably, the closed condition of the air flow enhancement assembly 18 is reinforced by a suitable means, such as the illustrated cam plate 36. Cam plate 36 rotates with the throttle shaft 31 and include raised portions for operatively engaging the valve plunger 33, such as a raised projection 37 on the plunger 33. Cam plate 36 includes a primary surface 41 which, when adjacent to the raised projection 37 of the valve plunger 33, permits the valve plunger 33 to remain in its open orientation as illustrated in FIG. 2. A camming plateau 42 operatively engages the valve plunger 33 as generally illustrated in FIG. 3 when the throttle plate 29 is in its opened orientation. In this orientation, it is assured that the valve plunger 33 will be fully seated and will remain so without concern that the valve plunger 33 will oscillate between an opened and closed orientation during open throttle conditions. The illustrated cam plate 36 also includes a camming ramp 43 in order to provide a smooth transition, if needed, between the primary surface 41 and the camming plateau 42. It will be appreciated that the cam plate 36 maintains the air flow enhancement assembly 18 in a closed condition during off-idle and/or open throttle operation of the engine 11.

Another embodiment of an air flow enhancer assembly 18a is illustrated in FIGS. 6, 7, 8 and 9. FIG. 6 also provides additional details of the engine 11. A plurality of cylinders 51, 52 and 53 are formed within the cylinder head 15, and pistons 54, 55 and 56, respectively, are mounted therewithin in the customary manner. Connecting rods 57 secure each piston to a crankshaft assembly 58 in a generally known manner. It will be observed that the crankshaft assembly 58 is generally vertically oriented, and the piston 54, 55, 56 and the cylinders 51, 52, 53 are generally horizontally oriented such that they are vertically positioned with respect to each other. Fuel enters the cylinders 51, 52, 53 through the crankcase from the injectors such as 59 for combustion therewithin. Unburnt fuel can accumulate along the bottom portion of the crankcase wall associated with each of cylinders 51, 52, 53.

Each illustrated cylinder 51, 52 and 53 includes a respective bleed outlet 61, 61a, 62, 62a, 63 and 63a. A check valve (see 64, 65 and 66 in FIG. 7) is located downstream of each bleed outlet in order to provide proper pressure flow of puddled fuel out of the cylinders in accordance with generally known principles. In the preferred form of the embodiment which is illustrated in Figs. 6, 7, 8 and 9, this fuel flows through the check valves 64, 65, 66, is collected in a common manifold line 67, and it flows under positive pressure therethrough and to the air flow enhancement assembly 18a.

The air flow enhancement assembly 18a performs the functions of enhancement assembly 18, while providing the additional function of removing puddled fuel and re-entering it into the engine for mixture in relatively low concentrations with air passing into the cylinders 51, 52, 53. A cone-shaped plunger or valve element 33a is biased in an outwardly positioned or opened orientation by biasing springs 34a or the like. In this manner, ambient air can enter the air intake chamber 24 through the opening 32 in the manner generally discussed hereinbefore with respect to assembly 18. This ambient air flows during engine start-up and abnormally low engine idle conditions as discussed elsewhere herein Movement of the valve plunger 33a to the closed orientation illustrated in FIG. 8 is facilitated by a plenum chamber or canister 68, which is air pressure operated.

With more particular reference to the plenum chamber 68, it includes a hollow canister for receiving the fuel from the common manifold line 67, which fuel is mixed with air and is under positive pressure. The plenum chamber 68 is substantially closed at one side by a resilient diaphragm 69 which is capable of flexing outwardly in response to buildup of pressure within the canister 68 to a chosen level. Diaphragm 69 includes a center plug 71 having a bleed hole 72. The bleed hole 72 is sized so as to prevent premature exit of fluid from out of the plenum chamber or canister 68. In other words, fluid pressure is allowed to build up within the plenum chamber 68 until a predetermined pressure is reached, thereby permitting fuel to accumulate within the plenum chamber 68 until such time as the air pressure within the plenum chamber moves the diaphragm 69 outwardly in order to force the valve plunger 33 to its closed orientation as illustrated in FIG. 8, or to maintain this orientation if low pressure conditions within the air intake chamber 24 have already closed the valve plunger 33a. When this is accomplished, the previously puddled fuel which had collected within the plenum canister 68 flows through the bleed hole 72 and into and through a longitudinal bore 73 within the valve plunger 33a. This fuel then enters the air intake chamber 24 under open throttle conditions for eventual recycling to the various cylinders of the engine.

It will be understood that the embodiments of the present invention which have been described are illustrative of some of the applications of the principles of the present invention. Numerous modifications may be made by those skilled in the art without departing from the true spirit and scope of the invention.

I claim:

1. A starting enhancer and stabilizer for two-cycle engines, comprising:
   intake valve means for selectively introducing supplemental air into an air intake throat of a two-cycle internal combustion engine, said intake valve means being positioned at a location downstream of throttle valve means for regulating primary air flow into and through the air intake throat;
   means for biasing said intake valve means in an opened orientation during which said supplemental flow of air passes into the throat at the downstream location;
   means for overcoming said biasing means and for permitting movement of the intake valve means to a closed orientation during which said supplemental flow of air into the throat substantially ceases; and
   said biasing means and overcoming means cooperate to form means for providing said supplemental flow of air into the throat during a start-up mode of the engine and for substantially ceasing said supplemental flow of air into the throat during an open throttle mode of the engine.

2. The enhancer and stabilizer according to claim 1, wherein said intake valve means includes a valve plunger for seating within an opening through the air intake throat at the downstream location, and wherein said biasing means spaces the valve plunger away from the opening for permitting said supplemental flow of air.

3. The enhancer and stabilizer according to claim 1, wherein said overcoming means includes camming means for operatively engaging the intake valve means, and wherein said camming means has a camming plateau that operatively engages the intake valve means upon movement of the camming means simultaneously with movement of a component of the throttle valve means.

4. The enhancer and stabilizer according to claim 1, wherein said overcoming means includes a plenum chamber having a resilient diaphragm for operatively engaging the intake valve means.

5. The enhancer and stabilizer according to claim 4, wherein said diaphragm is outwardly expanded for said operative engagement with the intake valve means when a predetermined pressure has built up within the plenum chamber.

6. The enhancer and stabilizer according to claim 5, further including bleed line means for communicating fuel from one location of the engine to and into said plenum chamber.

7. The enhancer and stabilizer according to claim 6, wherein said location within the engine providing the source of fuel includes a bleed outlet from the crankcase of the engine.

8. The enhancer and stabilizer according to claim 6, wherein said diaphragm includes a passageway for communicating the fuel from the plenum chamber and to said downstream location of the air intake throat.

9. The enhancer and stabilizer according to claim 8, wherein said intake valve means includes a valve plunger for seating within an opening through the air intake throat at the downstream location, and said valve plunger includes a bore in general alignment between said diaphragm passageway and said opening through the air intake throat.

10. The enhancer and stabilizer according to claim 1, wherein said intake valve means is for introducing ambient air as said supplemental flow of air.

11. A starting enhancer and stabilizer for fuel-injected two-cycle engines, comprising:
   intake valve means for selectively introducing supplemental ambient air into an air intake throat of a fuel-injected two-cycle internal combustion engine, said intake valve means being positioned at a location downstream of throttle valve means for regulating primary air flow into and through the air intake throat, said intake valve means including a valve plunger;
   means for biasing said valve plunger in an opened orientation during which said supplemental flow of air passes through an opening in the air intake throat and into the throat at the downstream location;
   means for overcoming said biasing means and for permitting movement of the valve plunger to a closed orientation during which said supplemental flow of air into the throat substantially ceases; and
   said biasing means and overcoming means cooperate to form means for providing said supplemental flow of air into the throat during a start-up mode of the engine and for substantially ceasing said supplemental flow of air into the throat during an open throttle mode of the engine.

12. The enhancer and stabilizer according to claim 11, wherein said overcoming means includes camming means for operatively engaging the valve plunger, and wherein said camming means has a camming plateau that operatively engages the valve plunger upon movement of the camming means simultaneously with movement of a component of the throttle valve means.

13. The enhancer and stabilizer according to claim 11, wherein said overcoming means includes a plenum chamber having a resilient diaphragm for operatively engaging the intake valve means, said diaphragm is outwardly expanded for said operative engagement with the valve plunger when a predetermined pressure has built up within the plenum chamber.

14. The enhancer and stabilizer according to claim 13, further including bleed line means for communicating fuel from one location of the engine to and into said plenum chamber, said diaphragm includes a passageway therethrough, and said valve plunger includes a bore in general alignment between said diaphragm passageway and said opening through the air intake throat, whereby when said predetermined pressure has built up said fuel lo flows from the plenum chamber and into said downstream location of the air intake throat during the open throttle mode of the engine.

15. A starting enhancer and stabilizer for fuel-injected two-cycle engines, comprising:
   intake valve means for selectively introducing a supplemental flow of ambient air into an air intake throat of a fuel-injected two-cycle internal combustion engine, said intake valve means being positioned at a location downstream of throttle valve means for regulating primary air flow into and through the air intake throat;
   means for biasing said intake valve means in an opened orientation during which said supplemental air flow of air passes through an opening in the air intake throat and into the throat at the downstream location;
   plenum chamber means for overcoming said biasing means and for permitting movement of the intake valve means to a closed orientation during which said supplemental flow of air into the throat substantially ceases, said plenum chamber means including a resilient diaphragm for selectively engaging the intake valve means when a predetermined pressure has built up within the plenum chamber; and
   said biasing means and overcoming means cooperate to form means for providing said supplemental flow of air into the throat during a start-up mode of the engine and for substantially ceasing said supplemental flow of air into the throat during an open throttle mode of the engine.

16. The enhancer and stabilizer according to claim 15, further including bleed line means for communicating fuel from the crankcase of the engine to and into said plenum chamber.

17. The enhancer and stabilizer according to claim 15, wherein said diaphragm includes a passageway for communicating the pressurized fluid from the plenum chamber and to said downstream location of the air intake throat.

18. The enhancer and stabilizer according to claim 17, wherein said intake valve means includes a valve plunger for seating within said opening through the air intake throat at the downstream location, and said valve plunger includes a bore in general alignment between said diaphragm passageway and said opening through the air intake throat.

* * * * *